United States Patent [19]
Brogan

[11] 4,335,084
[45] Jun. 15, 1982

[54] METHOD FOR REDUCING NO$_x$ EMISSIONS FROM COMBUSTION PROCESSES

[75] Inventor: Thomas R. Brogan, Charlestown, Mass.

[73] Assignee: Roldiva, Inc., Pittsburgh, Pa.

[21] Appl. No.: 275,096

[22] Filed: Jun. 19, 1981

Related U.S. Application Data

[63] Continuation of Ser. No. 106,534, Jan. 24, 1980.

[51] Int. Cl.$^3$ ................................................ B01D 53/34
[52] U.S. Cl. ...................................... 423/235; 110/345
[58] Field of Search .................. 423/235, 351; 110/345

[56] References Cited

U.S. PATENT DOCUMENTS 3,900,559  8/1975  Lyon ........................................ 423/235
4,115,515  9/1978  Tenner et al. .......................... 423/235
4,132,209  1/1979  Resler ................................. 423/235 X

FOREIGN PATENT DOCUMENTS 981109  4/1976  Canada ................................. 423/235

Primary Examiner—G. O. Peters
Attorney, Agent, or Firm—Reed, Smith, Shaw & McClay

[57] ABSTRACT

The present invention relates to a method for the non-catalytic reduction of NO$_x$ in combustion gases which method includes maintaining an excess of fuel to air during combustion, cooling the combustion gases to between 2400° F. and 3000° F., and injecting into the cooled gases ammonia in a ratio 1:1 to 1:4 NO$_x$ to NH$_3$. After the ammonia has been injected to reduce the NO$_x$, the gas is further cooled to between 1900° F. and 2300° F. and secondary air injected into the gases to complete combustion of the fuel.

6 Claims, 5 Drawing Figures

METHOD FOR REDUCING NO$_x$ EMISSIONS FROM COMBUSTION PROCESSES

This is a continuation of application Ser. No. 106,534, filed Jan. 24, 1980.

FIELD OF THE INVENTION

The invention relates to a method for the high temperature, noncatalytic, selective reduction of NO$_x$ in combustion gases, and, in particular, to a noncatalytic method of NO$_x$ reduction by ammonia injection.

BACKGROUND OF THE INVENTION

The oxides of nitrogen herein referred to as NO$_x$ include nitric oxide, nitrogen dioxide and nitrous oxide. These oxides result primarily from the combustion of fossil fuels by automobiles and various stationary sources. It generally is believed that NO$_x$ is produced by nitrogen fixation wherein the oxygen combines with the nitrogen rather than fuel in the region of the "flame." NO$_x$, and in particular NO$_2$, undergoes photochemical reactions in the presence of hydrocarbons to produce smog. NO$_x$ is a deleterious air pollutant which can be poisonous at high concentration levels.

A number of methods have been introduced to reduce NO$_x$ caused by the automobile, e.g., U.S. Pat. No. 3,894,141, applicable to the automobile are applicable to stationary sources; however, the conversse is not generally true. The present invention is concerned exclusively with NO$_x$ reduction in stationary sources, and, in particular, the reduction in NO$_x$ emanating from electric power generating stations.

A significant body of technology has been developed in an endeavor to reduce or eliminate NO$_x$ from combustion process emissions. See, *Gas Phase Decomposition of Nitric Oxide in Combustion Products,* Muzio, Arand and Teixeira, 16th Symposium on Combustion 1971 and the *EPRI Program on NO$_x$ Control Using Combustion Modification Techniques* 2d Stationary Source Combustion Symposium 1978. Of particular interest is the state-of-the art survey of all known flue gas denitrification processes undergoing current development in the United States and Japan: *Technical Assessment of NO$_x$ Removal Processes for Utility Application,* Fawcett, Maxwell, and Burnett (EPRI/EPA Nov. 1977). [NTIS P B 276 637]. Forty-eight processes are reviewed, including the "DENOX" process of Exxon Research & Engineering Company which is a selective, noncatalytic process for reducing NO$_x$ by injecting ammonia into a flue gas having an excess oxygen content and a temperature below 2000° F. More specifically, see U.S. Pat. No. 3,900,554 which describes the "DENOX" process as well as other known processes where ammonia is shown to be an effective reducing agent for NO$_x$ without the need of a catalyst.

In the DENOX process, a relatively large amount of ammonia is required for commercial application; for example, a NH$_3$: NO$_x$ mol. ratio of 3:1 to 4:1 is needed to obtain a 60 to 70% reduction in initial NO$_x$. On the other hand, a better than 90% reduction is achievable by both catalytic processes and wet-type processes. In both prior art catalytic and noncatalytic processes excess air is required. While there has been a suggestion, *EPRI Program on NO$_x$,* that reduction could be achieved in a fuel rich effluent, using methane, ethane and ammonia, such processes have not been used or found effective, see *STATUS OF NO$_x$ CONTROL FOR COAL-FIRED POWER PLANTS,* D. P. Teixeira. In fact, in the DENOX process it was found that NO$_x$ removal became insignificant in the absence of O$_2$, *Technical Assessment of NO$_x$ Removal.*

The object of the present invention, therefore, is to provide a noncatalytic process for removing NO$_x$ wherein the removal is 80% or better with final NO$_x$ concentration of about 50 ppm or less by volume. It is also an object of the invention to provide a removal process that is compatible, either sequentially or simultaneously, with sulfur oxide removal processes. A further object of the invention is to provide a NO$_x$ removal process that is effective in combustion systems using any fossil fuel. The process of the invention is useful in both conventional boiler systems as well as in magnetohydrodynamic systems. These objectives and the advantages of the invention can be better understood by a perusal of the following description of the best mode of the invention presently contemplated taken together with the accompanying drawings.

DESCRIPTION OF THE INVENTION

Figure 1:
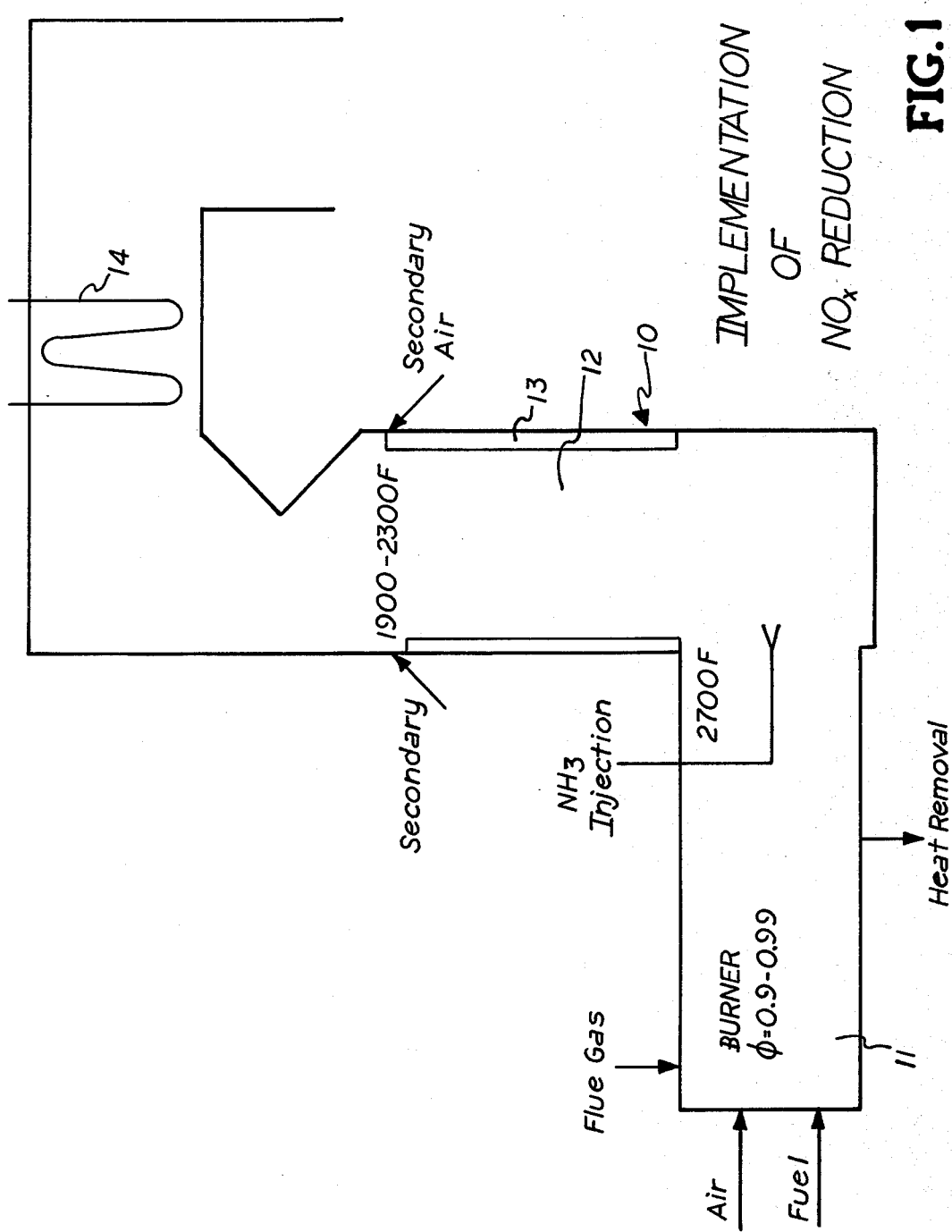
FIG. 1 is a diagrammatic view of a conventional boiler furnace.

With respect to FIG. 1, a diagrammatic view of a conventional furnace 10 is shown. It is to be understood that the furnace configuration does not form a part of the invention, nor does such configuration limit the applicability of the process. For purposes of illustrating the process furnace 10 includes a burner or combustion chamber 11, steam generator 12 comprising a plurality of boiler tubes 13 heated by radiation and superheater 14. Air and fuel are introduced into the combustion chamber as is recirculated flue gas used to control the temperature of the combustion gases.

The process of the present invention provides a reduction in the NO$_x$ present in the combustion gases. The process comprises the steps of controlling the air/fuel mixture of the burner 11 to maintain fuel rich combustion gases. The gases are cooled or maintained at a temperature of between about 2400° and 3000° F. in a first zone such as in the combustion chamber. Ammonia is injected into the combustion gases, preferably in a molar ratio of about 1:1 to 1:4 (NO$_x$:NH$_3$). The means for injecting the ammonia into the furnace should be such as to achieve a uniform dispersion. The temperature of the gases is permitted to cool so that in a second zone such as at the exit to steam generator 12 the gases are between 1900° F. and 2300° F. At that point, secondary air is injected into the gases to complete combustion and oxidize any carbon monoxide present therein.

It is desirable that the injection of ammonia and secondary air achieve as complete mixing as possible. One such method includes the use of injection rings positioned transversely to the flow of gases. The rings are water cooled and insulated. In the examples set forth hereinafter, rings were used in which 19 nozzles (0.030 in. orifices) were positioned on copper feed bases extending across the opening of the ring.

Preferably, the ratio $\phi$ of air or oxidizer to fuel in the combustion gases is maintained between 0.90 and 0.99 of stoichiometric with $\phi = 0.95$ being a desirable ratio. Under such conditions, the adiabatic flame temperature is about 3700° F. It has been found, however, that the noncatalytic reduction of $NO_x$ with ammonia is selective within the temperature range of from about 2400° F. to about 3000° or 3100° F. Where combustion gas temperature of about 2700° F. in the first zone affords optimal $NO_x$ reduction is achieved.

In the conventional steam generator the temperature of the combustion gases are reduced in the furnace by the simultaneous addition of flue gas (recirculated) and heat removal (e.g. steam generation). In the normal process, it is desirable for at least a portion of the flue gas to be added to the primary air immediately prior to the admission of primary air into the furnace. This addition has the effect of reducing the maximum temperature of combustion within the furnace so as to minimize the initial $NO_x$ concentration. Also heat may be removed from the combustion gases in the normal course by the production of steam in the boilers.

The ratio of flue gas recirculation to heat removal is a function of the use to which the heat of combustion is to be made. For example, in a steam boiler used in the generation of electrical power, flue gas recirculation could be alone used to achieve a temperature of 2700° F., but this would result in the availability of excess heat which is not used for superheat/reheat. However, if flue gas recirculation is not used and the temperature is maintained at 2700° F. by heat removal methods only, there would be inadequate heat available for superheat/reheat. Thus, in any application there is a balance that must be achieved to maintain superheat.

In magnetohydrodynamic applications, temperatures of about 4500° F. or above are achieved in the MHD combustion chamber under fuel rich conditions. The gas temperature leaving the MHD generator is normally around 3700° to 3800° F. and $NO_x$ typically in the range of about 2000 ppm. In order to reduce initial $NO_x$ prior to the introduction of ammonia the gas is slowly cooled (1 to 2 seconds) under reducing conditions to between 2500° to 3000° F. Cooling by radiation is achieved in a dwell chamber so that $NO_x$ is reduced to between about 200 and 800 ppm.

Preferably, the ammonia is added to the combustion gases after the gases exit or are about to exit the dwell chamber or when the gas reaches the preferred temperature range.

In both conventional furnaces and in MHD generators it has been found useful to dilute the concentration of ammonia with recirculated flue gas or nitrogen to increase the momentum of the ammonia for mixing. Normally anhydrous ammonia representing 1 to 10% of the total injected flow is metered into the carrier using, for example, a static in-line mixer. Such dilution results in an ammonia concentration of about 1 to 10% at the injection outlet. The flow rate is maintained so as to create a pressure drop across the nozzles. A 5 to 10 psig drop has been found useful.

Figure 2:
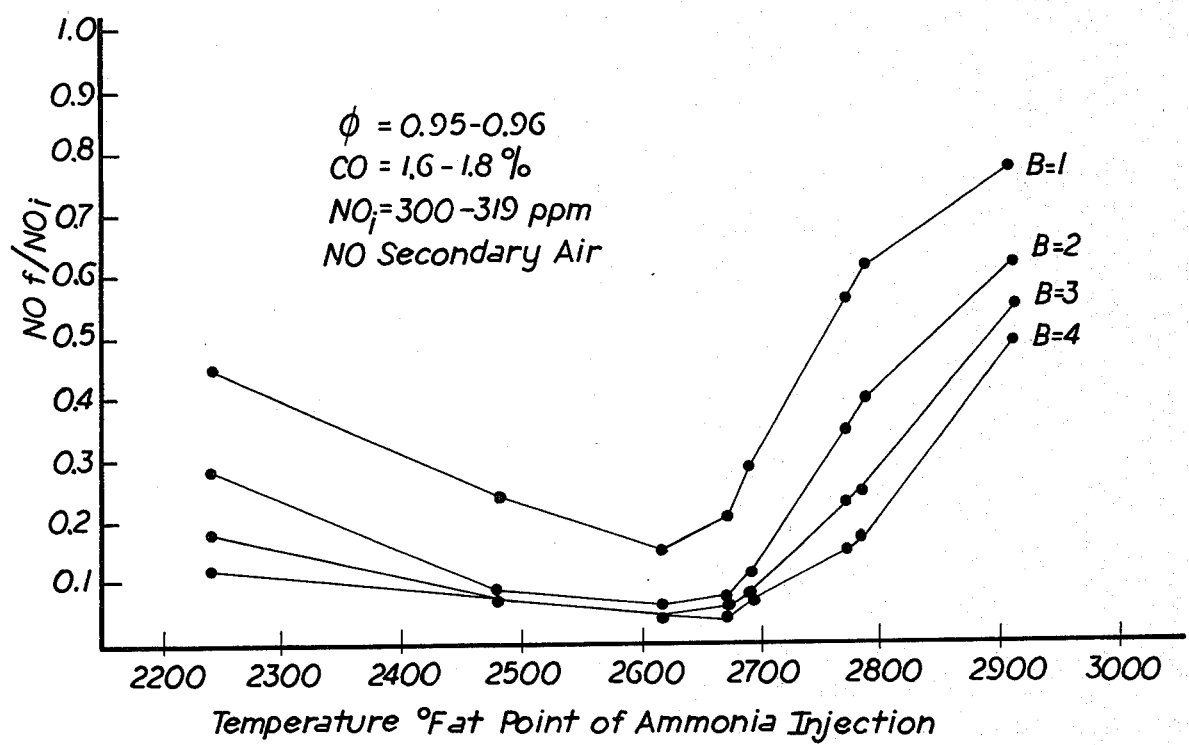
FIG. 2 is a graph which illustrates the reduction in NO$_x$ where only ammonia is introduced into the furnace.

The amount of ammonia injected is based upon the initial $NO_x$ concentration, the injection temperature, and the desired final $NO_x$ concentration. The molar relationship ($\beta$) of $NH_3$ to final $NO_x$ is graphically illustrated in FIGS. 2 through 4. The data was obtained from a furnace using fuel oil operated at $\phi \cong 0.95$. FIG. 2 shows that relationship as a function of $NH_3$ injection temperature without the injection of secondary air.

Figure 3:
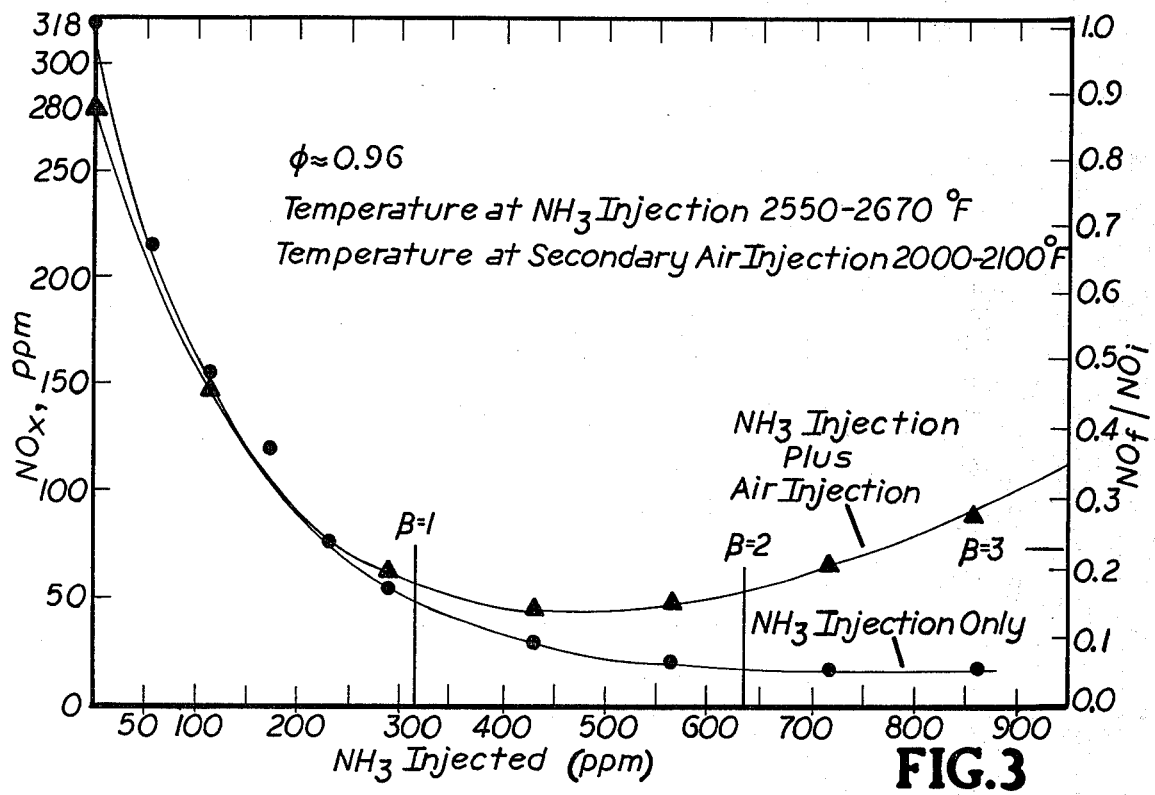
FIGS. 3 and 4 are graphs which illustrate the relationship between initial and final NO$_x$ of combustion gases for various molar ratios of NH$_3$ with secondary air.
Figure 4:
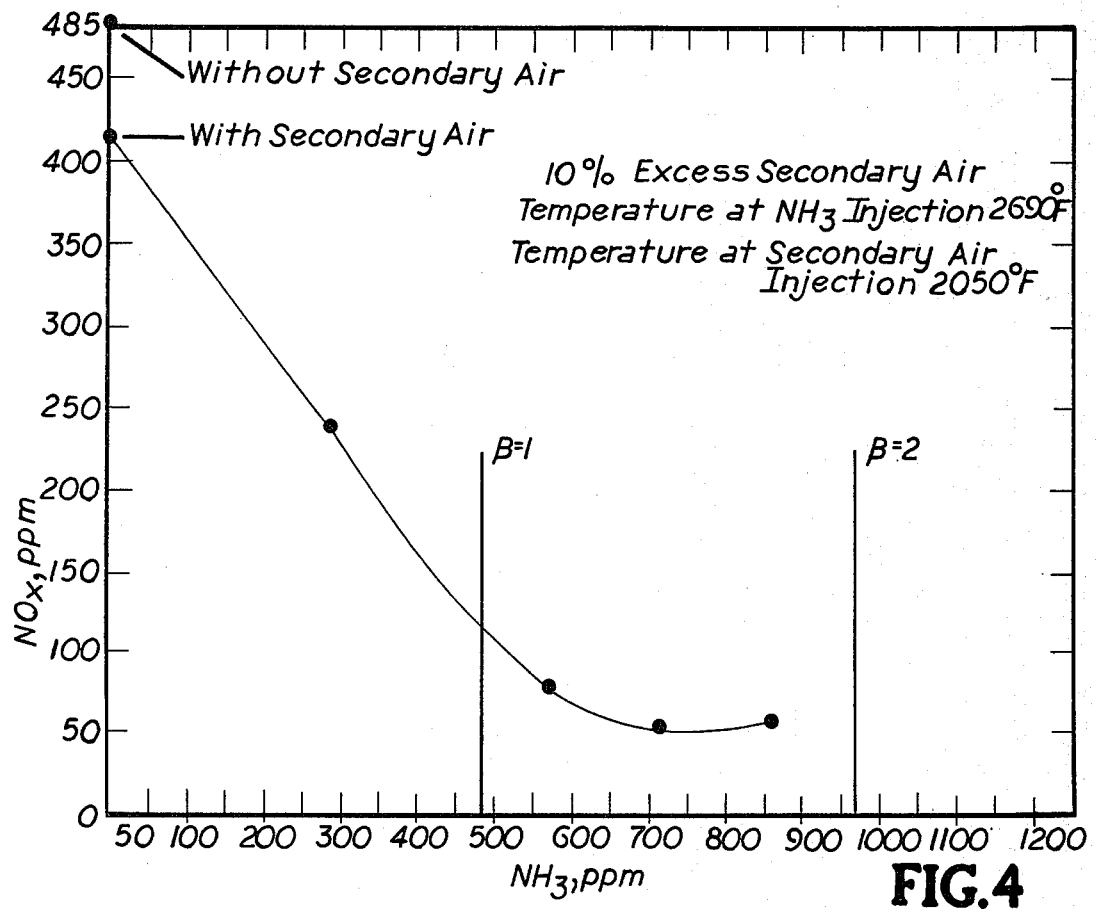
Figure 5:
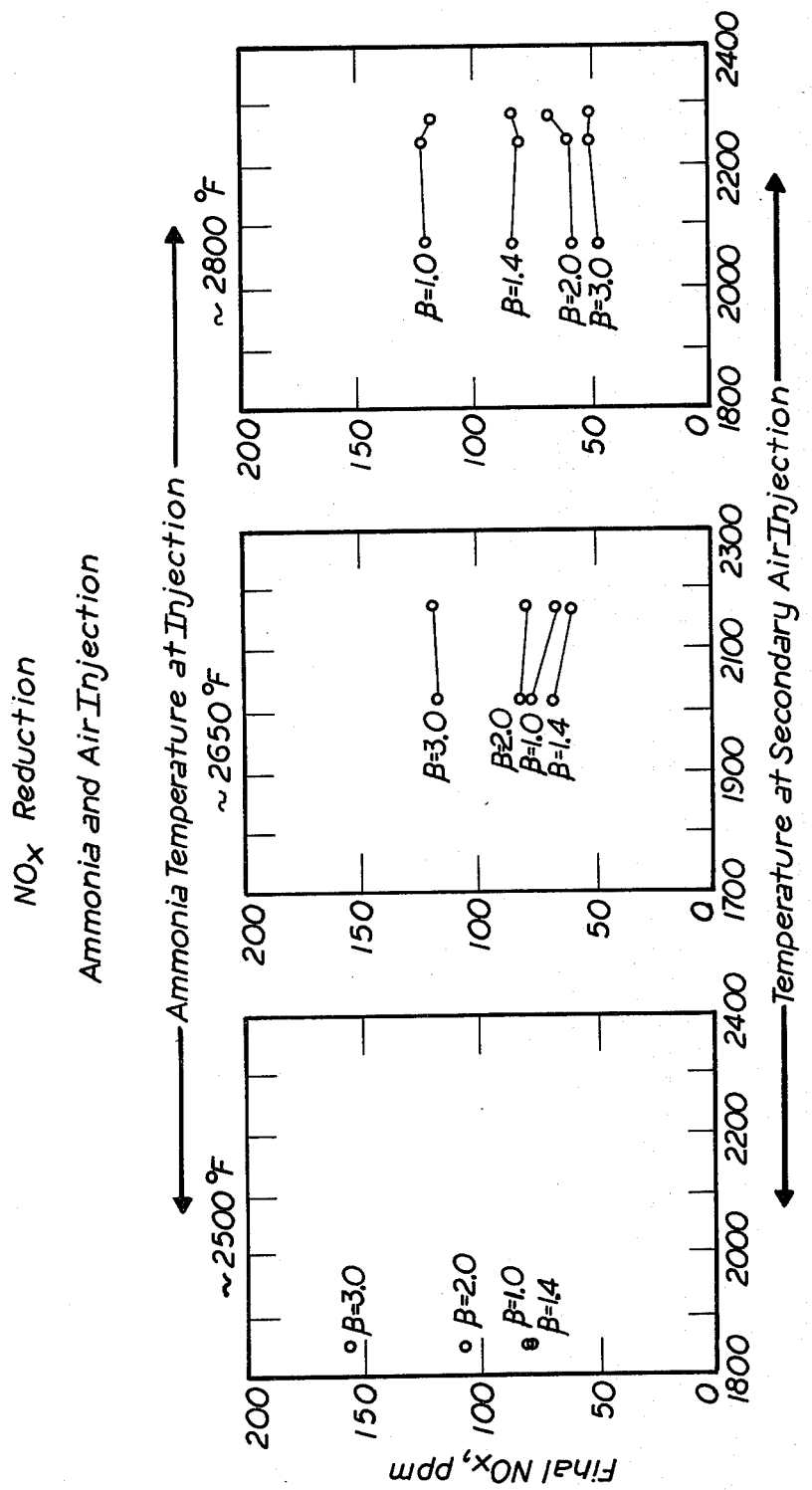
FIG. 5 is a graph showing the effect of secondary air and ammonia temperature injection on NO$_x$ removal.

In FIGS. 3 and 4, the temperature at the point of ammonia injection was maintained at approximately 2600° F. These curves show the effects on final $NO_x$ concentrations of varying $[NH_3/NO_{x(i)}]$ from 0 to 3. In FIG. 3 there is included a curve obtained by injecting ammonia only (i.e. with no secondary air) which graphically illustrates the effect of air when added to the gases. The graph of FIG. 4 is substantially the same as that depicted in FIG. 3 except for the higher initial $NO_x$ content of the combustion gases. FIG. 5, on the other hand, shows the effect of secondary air and ammonia injection temperatures on final $NO_x$ concentrations for various values of $\beta$.

As can be seen from the graphs of FIGS. 2-5 the preferred molar ratio of ammonia to initial $NO_x$ is $\beta = 1.4$ to 1.6. Ammonia carried over is oxidized to a degree to $NO_x$ by the subsequent addition of secondary air. By maintaining the temperature of the second zone during air injection to below 2400° F., formation of $NO_x$ by oxidation of the carry over ammonia can be substantially reduced. However, the effluent temperature should not be reduced below about 1900° F. ahead of the superheater 14 in FIG. 1 because of freeze out of carbon monoxide at temperatures below 1900° F.

While not shown in the curves, secondary air should not be added until sufficient time has elapsed from the time of ammonia injection. In boiler applications this would be from 0.5 to 2 seconds after ammonia injection based upon typical flow characteristics of the effluent. It is also dependent somewhat on the uniformity or dispersion characteristics of the ammonia injection; it being important to permit sufficient time for the ammonia to react with the $NO_x$.

While presently preferred embodiment of the invention has been described in detail, the invention may be otherwise embodied within the scope of the appended claims.

What is claimed is:

1. A method for reducing the $NO_x$ present in combustion gases which results from the combustion of fossil fuels with air, said method comprising the steps of
   a. controlling the air/fuel mixture for combustion to obtain fuel rich combustion gases in the combustion zone;
   b. maintaining or cooling the temperature of the combustion gas downstream of said combustion zone in a first zone at between about 2500° F. and 3000° F.;
   c. injecting ammonia in a molar ratio of 1:1 to 4:1 ($NH_3/NO_x$) into the combustion gases at the first zone;
   d. reducing the temperature of the combustion gases at a second zone to between 1900° F. and 2400° F.; and
   e. injecting secondary air into the combustion gases at the second zone to complete combustion of the fuel.

2. A method for reducing the $NO_x$ present in hot gases resulting from the combustion of fuel and oxidizer in a magnetohydrodynamic generator comprising the steps
   a. controlling the oxygen/fuel ratio of the combustion to obtain fuel rich combustion gases;
   b. slowly cooling the combustion gases in a first zone downstream of the MHD generator to between 2500° F. and 3000° F.;

c. injecting ammonia in a molar ratio of 1:1 to 4:1 (NH$_3$ to NO$_x$) into said combustion gases at said first zone;

d. reducing the temperature of the combustion gases at a second zone to between 1900° F. and 2400° F.; and e. injecting secondary air into the combustion gases at the second zone to complete the combustion of the fuel.

3. The methods set forth in claim 1 and 2 wherein the temperature of said first and second zones are maintained at about 2700° F. respectively.

4. The methods set forth in claims 1, 2 and 3 wherein said molar ratio of ammonia to the initial oxides of nitrogen is between about 1.1 and 1.5.

5. The methods set forth in claims 1, 2 and 3 wherein said first and second zones are separated by a gas travel time of from 0.5 to 2 seconds.

6. The methods set forth in claims 1 and 2 wherein said ratio of air to fuel is about from 0.9 to 0.99.

* * * * *